United States Patent [19]
Fukanuma et al.

[11] Patent Number: 5,711,659
[45] Date of Patent: Jan. 27, 1998

[54] METHOD OF MANUFACTURING A MOVABLE SCROLL ELEMENT AND A SCROLL ELEMENT PRODUCED BY THE SAME METHOD

[75] Inventors: Tetsuhiko Fukanuma; Yasushi Watanabe; Shinya Yamamoto, all of Kariya; Yuichi Tsumagari, Toyokawa; Shigeki Iwanami, Okazaki, all of Japan

[73] Assignees: Kabushiki Kaisha Toyoda Jidoshokki Seisakusho; Nippondenso Co., Ltd., both of Kariya, Japan

[21] Appl. No.: 677,955

[22] Filed: Jul. 10, 1996

[30] Foreign Application Priority Data

Jul. 10, 1995 [JP] Japan .................. 7-173563

[51] Int. Cl.⁶ ................. F04C 18/04; B23P 17/00
[52] U.S. Cl. ..................... 418/55.2; 29/888.022
[58] Field of Search .............. 418/55.2; 29/888.022

[56] References Cited

U.S. PATENT DOCUMENTS

| 4,824,345 | 4/1989 | Fukuhara et al. ............ 418/55.2 |
| 5,580,401 | 12/1996 | Williamson ................... 418/55.2 |

*Primary Examiner*—John J. Vrablik
*Attorney, Agent, or Firm*—Burgess, Ryan & Wayne

[57] ABSTRACT

A movable scroll element for a scroll type compressor is produced by a combination of a mold casting process and a machining process. The mold casting process produces a cast product having an end-plate forming portion, a spiral-member-forming portion and a projecting portion for forming a drive power receiving portion. The cast product has an entire outer faces covered with black scale, and the machining process machines the end-plate-forming portion, a spiral member forming portion, the projecting portion by cutting. Nevertheless, at least an outer circumference of the drive power receiving portion, i.e., a boss portion of the movable scroll element is covered with an outermost layer consisting of black scale. Thus, a sufficient mechanical strength of the movable scroll element is obtained even if the wall thickness of the drive power receiving portion, i.e., the boss portion of the movable scroll element, is reduced.

6 Claims, 5 Drawing Sheets

METHOD OF MANUFACTURING A MOVABLE SCROLL ELEMENT AND A SCROLL ELEMENT PRODUCED BY THE SAME METHOD

BACKGROUND OF THE INVENTION

1. Field of the Invention

The present invention relates generally to scroll type fluid machines, including a scroll type refrigerant compressor and, more particularly, relates to a method of manufacturing a movable scroll element accommodated in the scroll type machine and the movable scroll element produced by the method.

2. Description of the Related Art

Figure 5:
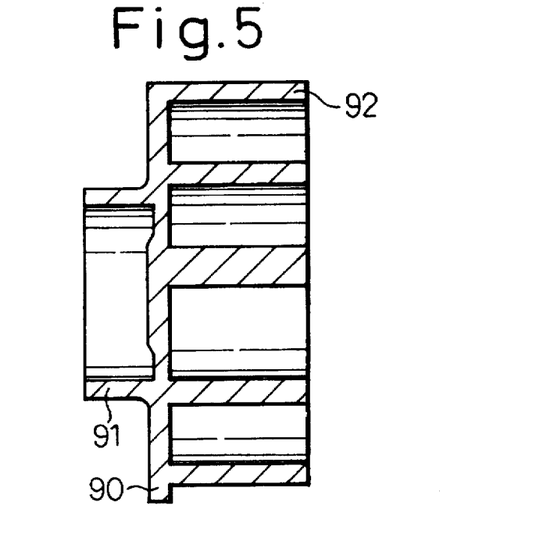
FIG. 5 is a cross-sectional view of a movable scroll element after completion of the casting and machining production processes, according to the present invention.

Scroll type fluid machines are known. For example, a scroll type refrigerant compressor can be provided with a stationary scroll element and a movable scroll element implementing an orbiting motion with respect to the stationary scroll element. As shown in FIG. 5, the movable scroll element includes a movable end plate 90 in the shape of a flat disk, a boss portion 91 projecting axially from one of the opposite end faces of the movable end plate 90, and a spiral member 92 projecting axially from the other of the end faces and extending spirally around a given axis vertical to the movable end plate 90. The boss portion 91 of the movable scroll element is provided for receiving a drive force for causing the orbiting motion.

The stationary scroll element is provided with a disk-like stationary end plate and a stationary spiral member axially projecting from one of the end faces of the stationary end plate so as to extend spirally about a given axis vertical to the stationary end plate.

In a scroll type compressor accommodating the above-mentioned stationary and movable scroll elements in a housing assembly, a drive bush (not shown in FIG. 5) is fitted in an inner bore of the boss portion 91 via a bearing member, and the drive bush is driven by a drive pin member eccentrically attached to a rotating drive shaft of the compressor. Thus, the drive bush moves in an orbiting path so as to cause the orbiting motion of the movable scroll element with respect to the stationary scroll element. The movable scroll element is prevented from being rotated about its own axis by a rotation preventing means arranged between the movable end plate 90 and the housing assembly. The movable spiral member 92 of the movable scroll element is in a constant contact engagement with the stationary spiral member of the stationary scroll element so as to define, therebetween, a plurality of compression chambers which are successively moved from the outer circumference portion of the stationary scroll element toward the center of the spiral elements of the stationary and movable scroll elements. During the movement of the plurality of compression chambers toward the center of the stationary and movable spiral members, the volumes of the respective compression chambers are gradually reduced to compress the refrigerant gas within the respective compression chambers.

Conventionally, the movable scroll element of the scroll type fluid machine is produced by a method as set forth below with reference to the illustration of FIG. 6.

Figure 6:
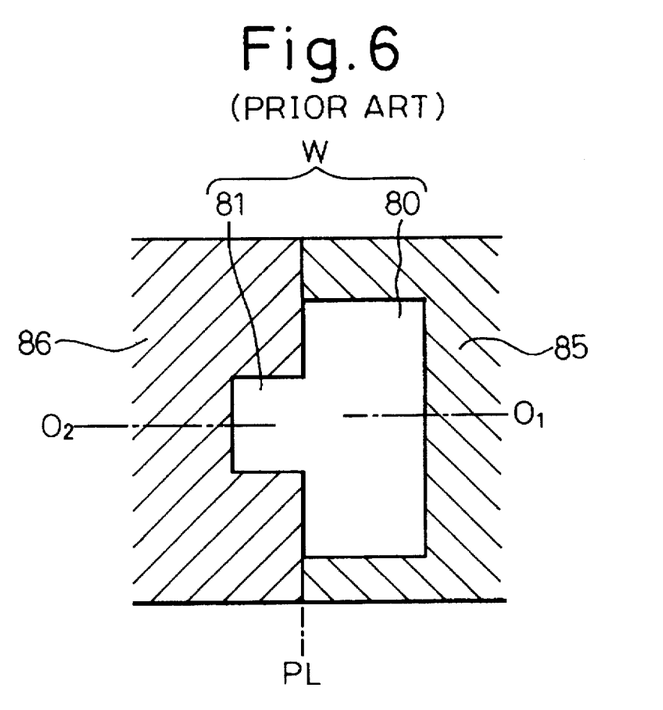
FIG. 6 is a cross-sectional view of a pair of sand molds used for the conventional method of producing a movable scroll element.
Figure 7A:
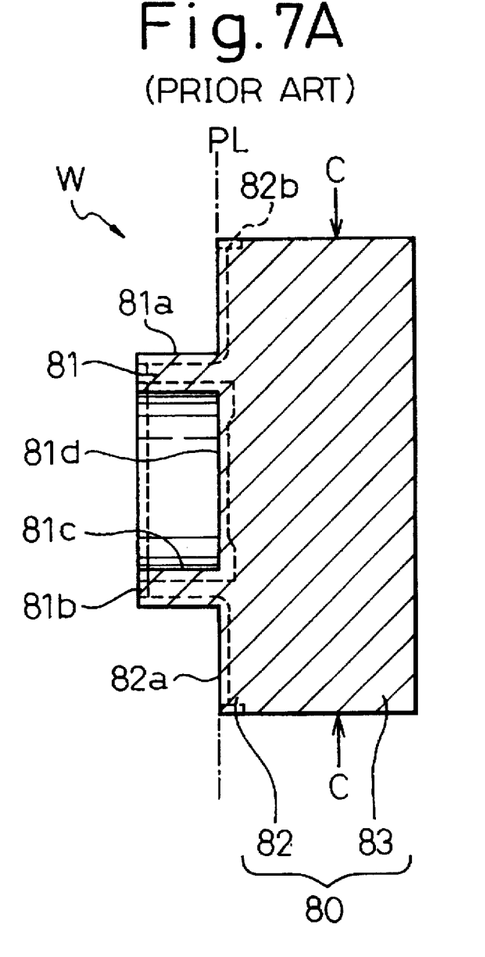
FIGS. 7A and 7B are cross-sectional views of a movable scroll element produced by the conventional production method.

As shown in FIG. 6, a workpiece "W" having a substantially cylindrical body 80 and a substantially cylindrical projection 81 projecting from one of the opposite end faces of the cylindrical body 80 is produced by the sand casting method by using a sand mold having a pair of molds, i.e., a first mold 85 for casting the cylindrical body 80, and a second mold 86 for casting the cylindrical projection 81. Namely, a filler such as a molten metal is poured in a cavity provided between the first and second sand molds 85 and 86 to obtain a cast product "W" shown in FIG. 7A. A parting line "PL" of the first and second sand molds 85 and 86 substantially lies in a plane located adjacent to an end face 82a of an end plate forming portion 82 of the cylindrical body 80.

Figure 7B:
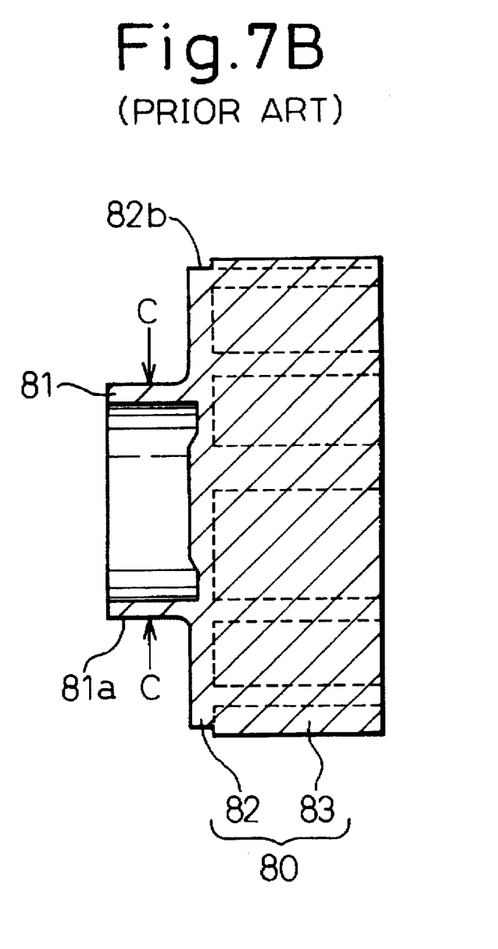

The cast product "W" obtained by the sand mold casting is subsequently subjected to a metal cutting process. Namely, the product "W" is rigidly held by a machine chuck, at an outer circumference of the cylindrical body 80 as shown by arrows C, and is subjected to a cutting process to finish the end face 82a of the end plate forming portion 82 and a part 82b of the outer circumference of the cylindrical body 80 as shown by dotted lines in FIG. 7A. Further, outer faces of the cylindrical projection 81 including a cylindrical outer face 81a, an end face 81b, an inner cylindrical face 81c, and an inner end face 81d are cut as shown by dotted lines in FIG. 7A. The cut product "W" is shown in FIG. 7B. Then, the cut product "W" is further subjected to a cutting process to finish a spiral portion 83 within an inner portion of the cylindrical body 80, as shown by dotted lines in FIG. 7B. When cutting the spiral portion 83, the product "W" is held by the machine chuck at the cylindrical outer face 81a of the cylindrical projection 81 as shown by arrows "C". Thus, as shown in FIG. 5, a finishing product of the movable scroll element having the movable end plate 90, the boss portion 91, and the movable spiral member 92 is obtained. Finally, a machining cut of a tip seal groove (not shown in FIG. 5) is carried out to obtain a final product of the movable scroll element. It should be noted that a different type of a movable scroll element for a scroll type compressor is known in which the movable element has pins with which a drive bush of the drive shaft of the compressor is engaged via bearings to cause an orbiting motion of the movable scroll element. The pins of the different type of movable scroll element are provided instead of the boss portion 91 of the movable scroll element of FIG. 5, and the different type of movable scroll element can be produced by the method substantially identical with the method described with reference to FIGS. 6, 7A, and 7B.

Nevertheless, the above-described conventional method of producing the movable scroll element for a scroll type fluid machine adopted a way of cutting overall outer faces of the cast product "W". Thus, a portion of the scroll movable element, i.e., a drive force receiving portion of the movable scroll element must be cut so as to have an increased thickness capable of obtaining a mechanical strength durable for the drive force provided during the operation of the scroll type compressor. Therefore, the scroll type fluid machines including the scroll type refrigerant compressors must include the movable scroll element having a large wall thickness, and accordingly, the size and weight of the compressor become unduly large from the viewpoint that the compressors mounted on vehicles should be light in weight.

When the drive power receiving portion of the movable scroll element consists of the afore-mentioned boss portion 91, the portion 91 receives, via a bearing, a drive power for causing an orbiting motion of the movable scroll element, and accordingly, the boss portion 91 must have a wall thickness sufficient for exhibiting appropriate mechanical strength. Therefore, if the boss portion 91 of the movable scroll element can be reduced in its wall thickness without sacrificing the mechanical strength thereof, the size and weight of the scroll type compressor can be appreciably reduced so as to permit the compressor to be mounted on the vehicles without any difficulty.

The present inventors have conducted analytical research for improving the mechanical strength of a movable scroll element, especially the boss portion thereof while appreciably reducing a wall thickness of the boss portion. As a result, it was found that in the conventional production method of the movable scroll element, an outermost layer, i.e., a black scale of the cast product "W" which permits the product "W" to have a sufficient mechanical strength, must be removed by machining or cutting. Therefore, the mechanical strength of the finished product, i.e., that of the movable scroll element as shown in FIG. 5 is reduced. The reason why the outermost layer or the black scale of the cast product "W" must be removed is that, since the cast product "W" having the cylindrical body 80 and the cylindrical projection 81 is obtained by using the sand molds 85 and 86 having the patting line PL lying in the plane located adjacent to the end face 82a of the cast product "W", it is difficult to obtain a coaxial condition between the center "O1" of the cylindrical body 80 and that "O2" of the cylindrical projection 81 of the cast product "W". Thus, the machining process for establishing the coaxial condition was indispensable for obtaining an accurate movable scroll element.

SUMMARY OF THE INVENTION

Therefore, an object of the present invention is to provide an improved method of producing a movable scroll element for a scroll type fluid machine to thereby reduce a wall thickness of a boss portion thereof without sacrificing a mechanical strength of the boss portion.

Another object of the present invention is to provide a mechanically strong movable scroll element for a scroll type fluid machine which has a small wall thickness at its boss portion receiving a drive power for causing an orbiting motion of the scroll element, and accordingly has reduced size and weight thereof compared with the conventional movable scroll element for scroll type fluid machines.

In order to achieve the above-mentioned objects, the inventors have conducted further research to obtain a finished product of the movable scroll element having at least a power receiving portion, i.e., a boss portion, which has black scale remaining on an outer face thereof but has a center thereof coaxial with that of the movable end plate and spiral member. As a result, it was found that if a parting line "PL" of the sand mold is moved so as to lie in a plane different from the plane located adjacent to the end face of the cast product of a movable scroll element, at least the boss portion of the movable scroll element can have the black scale remaining on the outermost circumference thereof while establishing a coaxial condition between the boss portion and the end plate and spiral member of the movable scroll element.

In accordance with a first aspect of the present invention, there is provided a movable scroll element adapted for being accommodated in a scroll type compressor, and including a disk-like end plate having opposite end faces, a drive power receiving portion axially projecting from one of the opposite ends of the end plate and receiving a drive power for causing an orbiting motion of the movable scroll element, and a spiral portion axially projecting from the other of the opposite end faces, the movable scroll element being produced by applying a predetermined amount of machine cutting to an incomplete cast or forged product of the movable scroll element. The movable scroll element is characterized in that the drive power receiving portion of the movable scroll element has an outer face on which an unmachined outermost layer of the incomplete cast or forged product of the movable scroll element remains without being subjected to machine cutting.

The remaining unmachined outermost layer of the drive power receiving portion of the movable scroll element permits the drive power receiving portion to have a sufficient mechanical strength even when the drive power receiving portion has a reduced wall thickness.

The disk-like end plate of the movable scroll element may have an outer circumference thereof on which an outermost unmachined layer remains on the incomplete cast or forged product without applying a predetermined amount of machine cutting thereto.

The outermost unmachined layer remaining on the outer circumference of the disk-like end plate permits the movable scroll element to be produced by applying a predetermined reduced amount of machining or cutting to the incomplete product of the movable scroll element. Thus, the production of the movable scroll element can be made easy and simple.

The drive power receiving portion of the movable scroll element may be a boss portion having a cylindrical inner circumference on which a bearing is fitted.

The spiral member of the movable scroll element is used for defining, for example, a plurality of compression chambers of a scroll type compressor. Thus, the spiral member must be formed to have a wall portion precisely extending along the involute curve. Further, outer faces of the movable scroll element except for the outer circumference of the drive power receiving portion, namely, the end face of the drive power receiving portion, the inner circumference of the boss portion, and the end face of the movable end plate of the movable scroll element must be accurately formed. This is because these outer faces are very important for implementing a basic operation of the scroll type fluid machine, e.g., a compressing operation of the scroll type compressor. Therefore, the above-mentioned outer faces of the movable scroll element except for the outer circumference of the drive power receiving portion must be subjected to an accurate machining operation applied to the cast or forged product during the process of producing the movable scroll element.

On the other hand, the drive power receiving portion or the boss portion is sufficiently strong to be provided with the cylindrical inner circumference on which a bearing member for transmitting the drive power for causing the orbiting motion of the movable scroll element can be fitted. Further, the outer circumference of the drive power receiving portion can be sufficiently strong to be able to avoid a mechanical interference with different elements of the scroll type fluid machine, and accordingly, the outer circumference of the drive power receiving portion does not need to be very accurately formed by machining. Thus, the unmachined layer of the cast or forged product may remain without being machined.

Further, the outer circumference of the movable end plate of the movable scroll element does not need to be accurately machined if the outer circumference of the end plate is formed within a given dimensional allowance so that the movable end plate is prevented from mechanically interfering with different elements of the scroll type fluid machine during the operation of the scroll type fluid machine.

In accordance with a second aspect of the present invention, there is provided a method of producing a movable scroll element adapted for being accommodated in a scroll type fluid machine. The method of producing the scroll element includes a mold-casting process for forming an integral cast product by using a pair of casting molds, the integral cast product consisting of a body portion having opposite end faces thereof, and end-plate-forming and spiral-member-forming portions extending between the opposite ends for forming a movable end plate and a spiral member of the movable scroll element, and of a cylindrical or columnar projecting portion integrally projecting from one of the opposite end faces of the body portion for forming a drive power receiving portion.

The method of producing the scroll element further includes a machining process for machining the end-plate-forming portion of the body portion of the integral cast product so as to obtain a disk-like end plate of the movable scroll element also machining the cylindrical or columnar projecting portion for obtaining the drive power receiving portion projecting from one end face of the disk-like end plate and receiving, via a bearing, a drive power causing an orbiting motion of the movable scroll element, and further machining the spiral-member-forming portion of the body portion for obtaining the spiral member axially projecting from the opposite end face of the disk-like end plate.

The method of producing a movable scroll element is characterized in that the casting process includes: using an identical one of the pair of casting molds for simultaneously obtaining both the end-plate-forming portion of the body portion from which the disk-like end plate is formed, and the cylindrical or columnar projecting portion while permitting the cylindrical or columnar projecting portion to have an outer diameter of which a dimensional allowance is restricted to a desired range of allowance.

The method of producing a movable scroll element is further characterized in that the machining process includes:

a first machining process for cutting an outer circumference of the end-plate-forming portion of the body portion and the spiral-member-forming portion of the body portion by holding an outer circumference of the cylindrical or columnar projecting portion of the cast product; and a second machining process for cutting the one of the opposite ends of the end-plate-forming portion of the body portion and an outer faces of the cylindrical or columnar projecting portion except for the circumference of the cylindrical or columnar projecting portion by holding the outer circumference of the end-plate-forming portion or the spiral-member-forming portion of the body portion after the first machining process.

Preferably, in the second machining process of the machining process, the spiral-member-forming portion after the first machining process should be held by a machine chuck.

In the above-described method of producing the movable scroll element, since one identical casting mold is used for simultaneously obtaining both the end-plate-forming portion of the body portion from which the disk-like end plate is formed, and the cylindrical or columnar projecting portion, a parting line of the pair of casting molds can lie in a plane extending through a portion of the body portion of the cast product. Thus, the body portion and the cylindrical or columnar projecting portion of the cast product have a common central axis. Namely, the body portion and the cylindrical or columnar projecting portion can be coaxial when both portions are cast. Therefore, it is possible to restrict the dimensional allowance of the outer diameter of the cylindrical or columnar projecting portion to the desired range of allowance. The outer circumference of the cylindrical or columnar projecting portion is used for holding the cast product to thereby carry out the first machining process for cutting the outer circumference of the end-plate-forming portion and the spiral-member-forming portion of the body portion. Therefore, the outer circumference of the movable end plate and the spiral member of the movable scroll element can be accurately machined.

In the second machining process, the end face of the movable end plate and the drive power receiving portion of the movable scroll element can be machined. At this stage, when the second machining process is processed by holding the spiral-member forming portion of the cast product, the drive power receiving portion is machined with respect to the spiral member, and accordingly, a good concentricity of the drive power receiving portion and the spiral member of the movable scroll element can be established.

The produced movable scroll element can be provided with the drive power receiving portion and the movable end plate having outer circumferences on which the outermost layer of the cast product, i.e., the black scale remains. Accordingly, the produced movable scroll element has sufficient mechanical strength.

In the above-described method of producing the movable scroll element, the drive power receiving portion of the movable scroll element may be formed as a boss portion axially projecting from one end face of the movable end plate and having an inner cylindrical face in which a bearing element is fitted. The boss portion can exhibit a sufficient mechanical strength even if the wall thickness thereof is small.

In accordance with a third aspect of the present invention, there is provided a method of producing a movable scroll element adapted for being accommodated in a scroll type fluid machine. The method of producing the scroll element includes a mold-casting process for forming an integral cast product by using a pair of casting molds, the integral cast product consisting of a body portion having opposite end faces thereof, and end-plate-forming and spiral-member-forming portions extending between the opposite ends for forming a movable end plate and a spiral member of the movable scroll element, and of a cylindrical or columnar projecting portion integrally projecting from one of the opposite end faces of the body portion for forming a drive power receiving portion.

The method of producing the scroll element further includes a machining process for machining the end-plate-forming portion of the body portion of the integral cast product so as to obtain a disk-like end plate of the movable scroll element, also machining the cylindrical or columnar projecting portion for obtaining the drive power receiving portion projecting from one end face of the disk-like end plate and receiving, via a bearing, a drive power causing an orbiting motion of the movable scroll element, and further machining the spiral-member-forming portion of the body portion for obtaining the spiral member axially projecting from the opposite end face of the disk-like end plate.

The method of producing a movable scroll element is characterized in that the casting process includes: using an identical one of the pair of casting molds for simultaneously obtaining both the end-plate-forming portion of the body portion from which the disk-like end plate is formed, and the cylindrical or columnar projecting portion while permitting the cylindrical or columnar projecting portion and the end-plate-forming portion of the body portion to have respective outer diameters of which respective dimensional allowances are restricted to respective desired ranges of allowance.

The method of producing a movable scroll element is further characterized in that the machining process includes:

a first machining process for cutting the spiral-member-forming portion of the body portion by holding an outer circumference of the end-plate-forming portion of the cast product or an outer circumference of the cylindrical or columnar projecting portion of the cast product; and a second machining process for cutting one of the opposite ends of the end-plate-forming portion of the body portion and outer faces of the cylindrical or columnar projecting portion except for the outer circumference of the cylindrical or columnar projecting portion by holding the outer circumference of the end-plate-forming portion or the spiral-member-forming portion of the body portion after the first machining process.

Preferably, in the second machining process of the machining process, the spiral-member-forming portion after the first machining process should be held by a machine chuck.

In the above-described method of producing the movable scroll element, since one identical casting mold is used for simultaneously obtaining both the end-plate-forming portion of the body portion from which the disk-like end plate is formed, and the cylindrical or columnar projecting portion, a parting line of the pair of casting molds can lie in a plane extending through a portion of the body portion of the cast product. Thus, the body portion and the cylindrical or columnar projecting portion of the cast product have a common central axis. Namely, the body portion and the cylindrical or columnar projecting portion can be coaxial when both portions are cast. Therefore, it is possible to restrict the dimensional allowances of the outer diameters of the cylindrical or columnar projecting portion and of the end-plate-forming portion of the body portion to the respective desired ranges of allowance.

At this stage, when the second machining process is performed by holding the spiral-member-forming portion of the body portion after the first machining process, the drive power receiving portion of the movable scroll element is directly formed with reference to the movable spiral member of the movable scroll element. Thus, the concentricity of the drive power receiving portion and the spiral member of the movable scroll element can be good.

In the above-described method of producing the movable scroll element according to the third aspect of the present invention, the drive power receiving portion of the movable scroll element may be formed as a boss portion axially projecting from one end face of the movable end plate and having an inner cylindrical face in which a bearing element is fitted. The boss portion can exhibit a sufficient mechanical strength even if the wall thickness thereof is small.

BRIEF DESCRIPTION OF THE DRAWINGS

The above and other objects, features, and advantages of the present invention will be made more apparent from the ensuing description of the preferred embodiments in conjunction with the accompanying drawings wherein.

DESCRIPTION OF THE PREFERRED EMBODIMENTS

The description of the first and second embodiments of the present invention will be provided below with reference to FIGS. 1 through 5.

It should be understood that in the first and second embodiments of the present invention, a method of producing a scroll element adapted to being accommodated in a scroll type fluid machine includes a mold-casting process for producing a cast product as an incomplete product of the movable scroll element, and a machining process for completing a finished product of a movable scroll element.

(First Embodiment)

Figure 1:
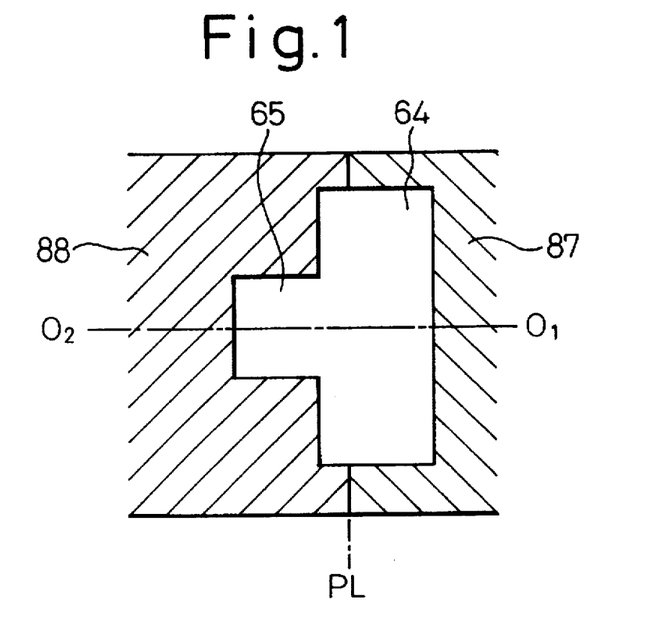
FIG. 1 is a cross-sectional view of a pair of sand molds used for performing a method of producing a movable scroll element for a scroll type fluid machine, according to a first embodiment of the present invention.

As shown in FIG. 1, a pair of sand molds including a first sand mold 87 and a second sand mold 88 are used for performing a mold casting of an integral cast product "W" of which a movable scroll element 4 (see FIG. 3) is made.

The first sand mold 87 is used for casting a substantially columnar or cylindrical body portion 64, and the second sand mold 88 is used for casting a substantially cylindrical projecting portion 65 integrally projecting from one end of the body portion 64.

Figure 2A:
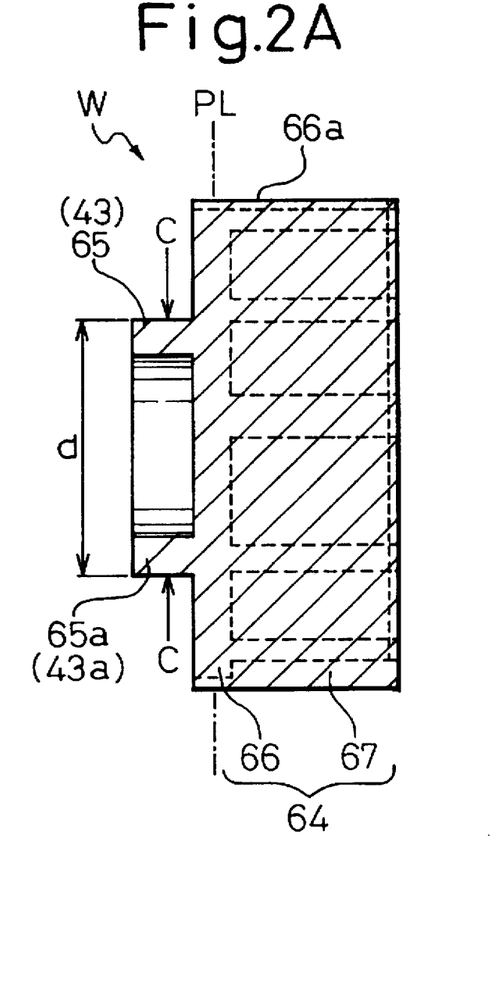
FIGS. 2A and 2B are cross-sectional views of a movable scroll element produced by the method according to the first embodiment of the present invention, illustrating a machining process of the scroll element.
Figure 2B:
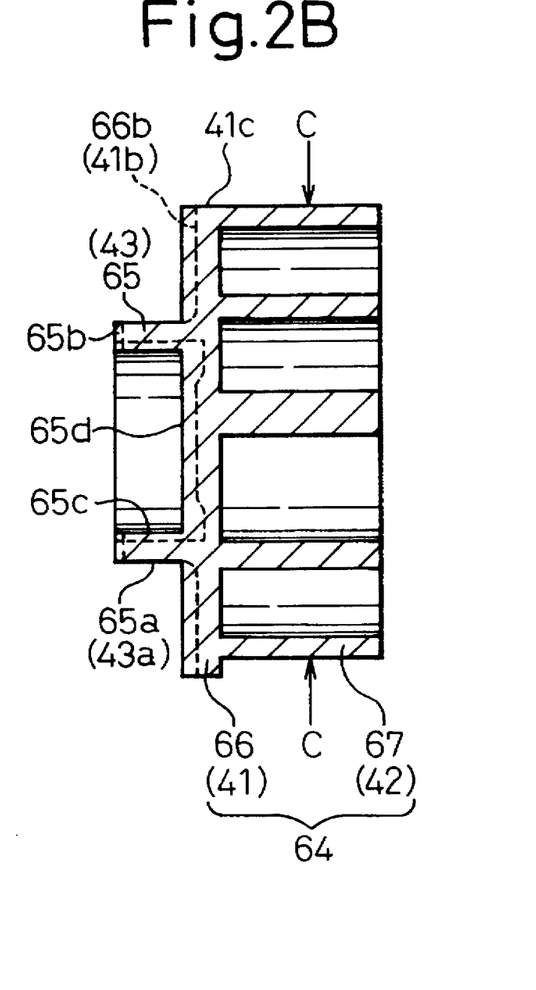

Referring to FIGS. 1, 2A, and 2B, initially, a molten filler, namely, molten aluminum alloy is poured into a cavity formed by the first and second sand molds 87 and 88 so as to obtain the cast product "W" having the body portion 64 and the projecting portion 65. At this stage, an end plate forming portion 66 (FIG. 2A) of the body portion 64 and the projecting portion 65 are cast by the identical sand mold, i.e., the second sand mold 88. Thus, a parting line "PL" of the first and second sand molds 87 and 88 lies in a plane extending through a portion of the body portion 64, and accordingly, the center $O_1$ of the body portion 64 coincides with the center $O_2$ of the projecting portion 65 of the integral cast product "W". Therefore, it is possible to limit the outer diameter "d" of the projecting portion 65 to a desired range of dimension having a predetermined allowance, from the viewpoint of the mechanical design of the movable scroll element 4.

When the integral cast product "W", which is an incomplete product of the movable scroll element 4, is obtained by the sand mold casting, the product "W" is forwarded to a subsequent machining process.

Namely, in a first machining process, an outer circumference 65a of the projecting portion 65 (an outer circumference 43a of the boss portion 43) is grasped or held by a machine chuck (not shown) as indicated by arrows C, and an outer circumference 66a of the end plate forming portion 66 and a spiral member forming portion 67 are subjected to a machining process by cutting, as shown by dotted lines in FIG. 2A. Thus, as shown in FIG. 2B, an outer circumference 41c of a movable end plate 41 of the movable scroll element 4 is formed of the outer circumference 64a of the end plate forming portion 66, and a spiral member 42 of the movable scroll element 4 is formed of the spiral member forming portion 67.

Subsequently, a second machining process is performed with the cast product "W" after the first machining process. Namely, the spiral member forming portion 67 formed in the movable spiral member 42 is grasped or held by the machine chuck as shown by arrows C. Thus, one of the opposite end faces of the end plate forming portion 66, i.e., the end face 66b, and an inner faces of the projecting portion 65 except for the outer circumference 65a, i.e., an inner cylindrical face 65c and an inner end face 65d of the projecting portion 65 are subjected to a machining process by cutting. At this stage, if preferable, an outer circumference 66a of the end plate forming portion 66 (an outer circumference 41c of the movable end plate 41) may be grasped by the machine chuck to cut the end face 66b, and the inner cylindrical face 65c and the inner end face 65d of the projecting portion 65. Thus, an end face 41b of the movable end plate 41 is obtained from the machined end face 66b of the end plate forming portion 66, and a boss portion 43 of the movable scroll element 4 is obtained from the end face 65b and inner faces of the projecting portion 65. At this stage, it should be understood that the second machining process is carried out by holding the spiral member forming portion 67 after the first machining process. Therefore, the boss portion 43 is cut directly with reference to the movable spiral member 42 to ensure a good concentricity of the boss portion 43 and the movable spiral member 42.

After the second machining process, tip seal grooves (not shown in FIGS. 2A and 2B) are cut in the end of the spiral member 42, and the production of the movable scroll element 4 is completed. Therefore, the completed movable scroll element 4 is provided with an outermost layer, i.e., a black scale, remaining on the outer circumference 43a of the boss portion 43. Accordingly, the mechanical strength of the movable scroll element 4 can be higher than that of the movable scroll element produced by the conventional production method.

Figure 3:
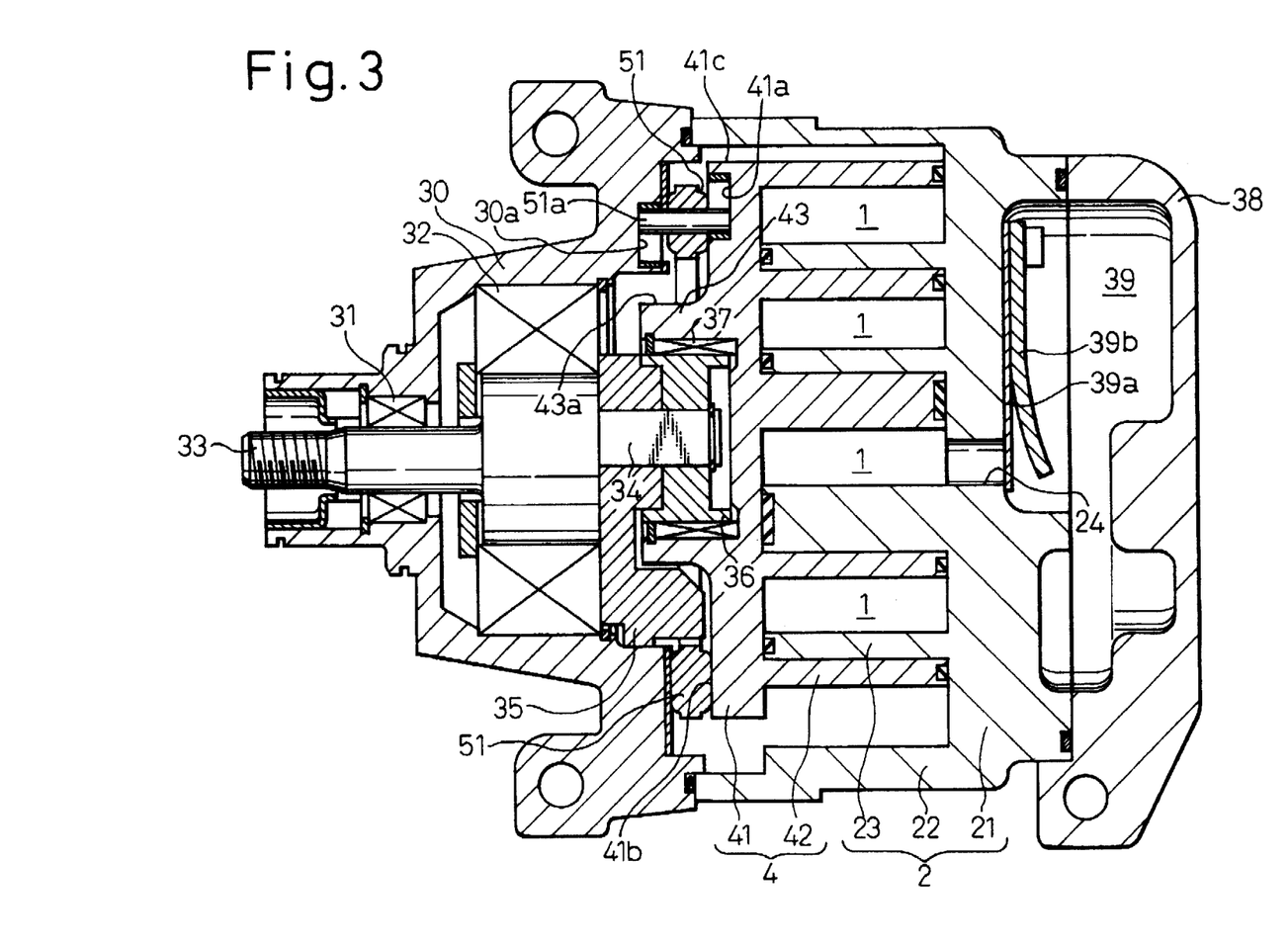
FIG. 3 is a longitudinal cross-sectional view of a scroll type compressor in which a scroll element produced by the method according to the present invention may be accommodated, illustrating a general internal construction of the compressor.

FIG. 3 illustrates a scroll type compressor incorporating therein the movable scroll element 4 which is produced by the above-described production method.

In the scroll type compressor of FIG. 3 the movable scroll element 4 is operatively engaged with a stationary scroll element 2 so as to define a plurality of compression chambers 1. The stationary scroll element 2 has a disk-like stationary end plate 21, an outer shell portion 22 integral with the stationary end plate 21, and a stationary spiral member 23 extending along a predetermined curve such as an involute curve.

The movable scroll element 4 has the disk-like movable end plate 41, the movable spiral member 42 formed integrally with the movable end plate 41 on the rear side of the plate 41 so as to extend along the same curve as the stationary spiral member 23, and the boss portion 43 formed integrally with the movable end plate 41 on the front side of the plate 41.

A front housing 30 is secured by an appropriate securing means such as screw bolts to the outer shell portion 22 of the stationary scroll element 2 via sealing elements. In the front housing 30, a drive shaft 33 is rotatably supported via a shaft seal device 31 and a primary anti-friction bearing 32. The drive shaft 33 is provided with an internal large diameter portion having an inner end from which a slide key 34 projects. The slide key 34 has a counter weight 35 and a drive bush member 36 fitted thereon in a juxtaposed manner. On the latter drive bush member 36 is mounted the boss portion 43 of the movable end plate 41 of the movable scroll element 4 via a secondary anti-friction bearing 37.

Movable rings 51 having a predetermined number of rotation preventing pins 51a are arranged between the front housing 30 and the movable end plate 41 of the movable scroll element 4 so as to be spaced apart from each other in a circumferential direction about the center of the front housing 30. The movable rings 51 and the rotation preventing pins 51a cooperate with one another so as to prevent the movable end plate 41 of the movable scroll element 4 from rotating about its own axis. Each movable ring 51 is engaged with the predetermined numbers of axial pins 51a which are fitted in bores 30a of the front housing 30 and in bores 41a of the movable end plate 41 via suitable liner members as shown in FIG. 3. Thus, the movable ring 51 and the plurality of pins 51a receive radial forces acting thereon from the drive shaft 33 and the movable end plate 41 per se to thereby function as a rotation preventing device for the movable end plate 41 during the operation of the scroll type compressor.

A different movable ring 51 having no rotation preventing pins 51a is also arranged between the movable end plate 41 and the front housing 30, and is provided with front and rear end faces kept in contact with the front housing 30 and the movable end plate 41 as shown in a lower portion of FIG. 3. The different movable ring 51 functions so as to receive an axial force acting thereon from the movable end plate 41 of the movable scroll element 4.

The front housing 30 is provided with an inlet port (not shown in FIG. 3) which fluidly communicates with an external refrigerating system such as an automobile refrigerating system. The inlet port further communicates with the respective compression chambers 1 via apertures formed in the movable rings 51 when the respective chambers 1 are moved to a suction position for sucking refrigerant gas.

The scroll type compressor further includes a rear housing 38 secured by appropriate securing means to the stationary end plate 21 of the stationary scroll element 2. The rear housing 38 defines therein a discharge chamber 39 which fluidly communicates with a discharge port 24 centrally formed in the stationary end plate 21 of the stationary scroll element 2 via a discharge valve 39a and a valve retainer 39b. The discharge chamber 39 further fluidly communicates with the above-mentioned external refrigerating system via an outlet port (not shown in FIG. 3) formed in the rear housing 38.

In the described scroll type compressor of FIG. 3, a drive shaft 33 is connected to an automobile engine via a transmission means such as a solenoid clutch. Thus, the drive shaft 33 is rotatively driven by the automobile engine. Therefore, the slide key 34 directly connected to the drive shaft 33 is eccentrically rotated around the axis of rotation of the drive shaft 33. Thus, the eccentric rotation of the slide key 34 moves the drive bush 36 mounted thereon so that the latter drive bush 36 cooperates with the movable rings 51, and the rotation preventing pins 51a fitted in the bores 30a and 41a so as to cause an orbiting motion of the movable scroll element 4 along a predetermined orbiting path. Accordingly, the respective compression chambers 1 defined by the stationary end plate 21 and the stationary spiral member 23 of the stationary scroll element 2 and the movable end plate 41 and the movable spiral member 42 of the movable scroll element 4 are succeedingly moved to the center of the engaged stationary and movable spiral members 23 and 42 while respective volumes thereof are reduced. During the movement of the respective compression chambers 1, the refrigerant is sucked into the respective compression cheers 1 via the inlet port, and is subsequently compressed due to the reduction in the volumes of the respective compression chambers 1. The compressed refrigerant is discharged into the discharge chamber 39 via the outlet port 24 and the discharge valve 39a.

During the compressing operation of the scroll type compressor, the movable scroll element 4 produced by the production method of the first embodiment can exhibit a sufficient mechanical strength for the reason that, even if the boss portion 43 of the movable scroll element 4 has a small wall thickness, the outer circumference 43a thereof has an outermost layer remaining thereon, and consisting of the black scale, generated during the mold casting process of the cast product "W". Thus, due to the small wall thickness of the movable scroll element 4, the entire size and weight of the scroll type compressor can be small. Accordingly, the scroll type compressor is easily mounted in an automobile engine compartment.

Further, in the conventional production method of the movable scroll element, the machining process after the casting process does not permit an outermost layer consisting of a black skin to remain on any portion of the outer faces of the movable scroll element. Therefore, when the machining process is completed, it is impossible to detect various dimensions of the movable scroll element with reference to the outermost layer of the cast product "W". Thus, if the movable scroll element after the completion of the machining process contains therein some defective dimensions, detection of a cause for the defective dimensions of the movable scroll element cannot be achieved, and accordingly, the production yield of the conventional scroll element must often become low.

To the contrary, the movable scroll element 4 produced by the production method of the first embodiment of the present invention has an outermost layer, consisting of the black scale generated by the mold casting process, remaining on the outer circumference 43a of the element 4. Thus, during the production process of the movable scroll element 4, it is possible to easily detect a cause of potential defective portions of the movable scroll element with reference to the outer circumference 43a covered with the black scale. Accordingly, the production yield of the movable scroll element produced by the production method of the first embodiment of the present invention can be appreciably high.

Furthermore, since the movable scroll element produced by the production method of the first embodiment of the present invention can be obtained by cutting only a part of the cast product "W", the production cost can be reduced resulting in lowering of the manufacturing cost of the scroll type compressor.

The description of the second embodiment of the present invention is provided below.

(Second Embodiment)

Similarly to the first embodiment, a pair of sand molds including a first sand mold 87 and a second sand mold 88 shown in FIG. 1 is used for casting an integral cast product "W" of which a movable scroll element 4 (see FIG. 3) is made.

Figure 4A:
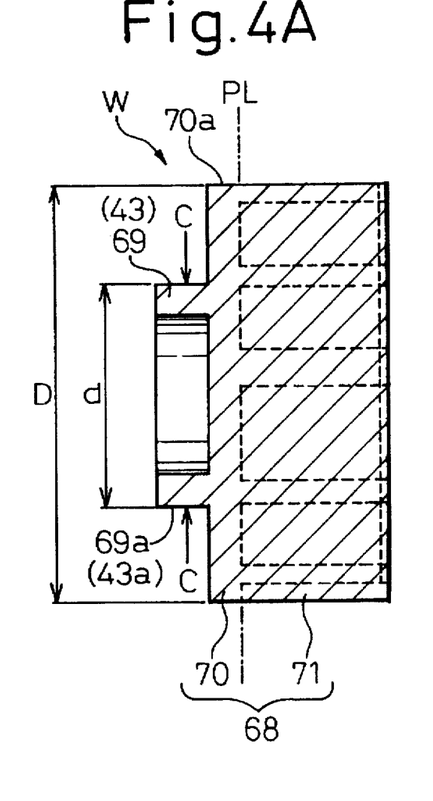
FIGS. 4A and 4B are cross-sectional views of a movable scroll element produced by the method according to a second embodiment of the present invention, illustrating a machining process of the scroll element.

The first sand mold 87 is used for casting a substantially columnar or cylindrical body portion 68 of the cast product "W" shown in FIG. 4A, and the second sand mold 88 is used for casting a substantially cylindrical projecting portion 69 (FIG. 4A) integrally projecting from one end of the body portion 68.

At this stage, an end plate forming portion 70 (FIG. 4A) of the body portion 68 and the projecting portion 69 are cast by the identical sand mold, i.e., the second sand mold 88. Thus, a parting line "PL" of the first and second sand molds 87 and 88 lies in a plane extending through a portion of the body portion 68, and accordingly, the center $O_1$ of the body portion 68 coincides with the center $O_2$ of the projecting portion 69 of the integral cast product "W". Therefore, it is possible to limit the outer diameter "D" of the end plate forming portion 70 of the body portion 68 and that "d" of the projecting portion 69 to a desired range of dimension having a predetermined allowance, respectively, from the viewpoint of the mechanical design of the movable scroll element 4.

When the integral cast product "W" which is an incomplete product of the movable scroll element 4 is obtained by sand mold casting, the product "W" is forwarded to a subsequent machining process.

Figure 4B:
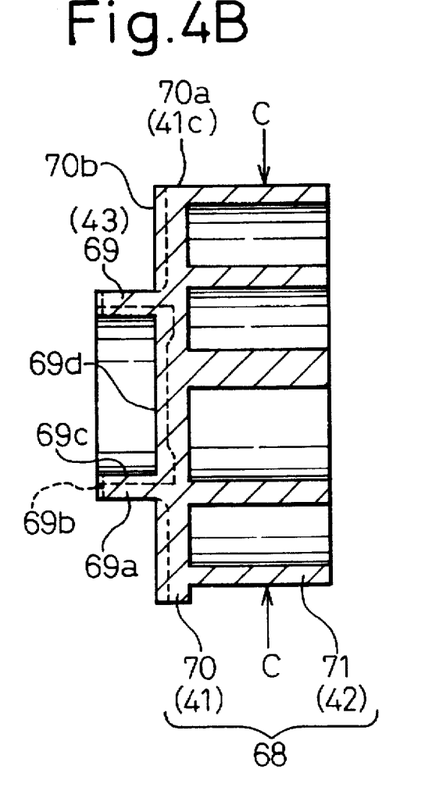

Namely, in a first machining process, an outer circumference 69a of the projecting portion 69 (an outer circumference 43a of the boss portion 43) of the integral cast product "W" is grasped or held by the machine chuck as indicated by arrows C in FIG. 4A, and a spiral member forming portion 71 of the body portion 68 is subjected to a machining process by cutting, as shown by dotted lines in FIG. 4A. Alternatively, an outer circumference 70a of the end plate forming portion 70 (an outer circumference 41c of the movable end plate 41) of the body portion 68 may be grasped by the machine chuck. Thus, as shown in FIG. 4B, a spiral member 42 of the movable scroll element 4 is formed of the spiral member forming portion 71.

Subsequently, a second machining process is performed with the cast product "W" after the first machining process. Namely, the spiral member forming portion 71 formed as the movable spiral member 42 in the first machining process is grasped or held by the machine chuck as shown by arrows C. Thus, one of the opposite end faces of the end plate forming portion 70, i.e., the end face 70b, and outer faces of the projecting portion 69 except for an outer circumference 69a of the portion 69, i.e., an outer end 69b and an inner faces (a cylindrical face 69c and an inner end face 69d of the projecting portion 69) are subjected to a machining process by cutting. At this stage, if preferable, an outer circumference 70a of the end plate forming portion 70 (an outer circumference 41c of the movable end plate 41) may be grasped by the machine chuck. Thus, an end face 41b of the movable end plate 41 is obtained from the machined end face 70b of the end plate forming portion 70, and a boss portion 43 of the movable scroll element 4 is obtained from the end face 69b and inner faces of the projecting portion 69. At this stage, it should be understood that the second machining process is carried out by holding the spiral member forming portion 71 after the first machining process. Therefore, the boss portion 43 is cut directly with reference to the movable spiral member 42 to ensure a high concentricity of the boss portion 43 and the movable spiral member 42.

In the described production method of the movable scroll element 4 according to the second embodiment of the present invention, the outer circumference 43a of the boss portion 43 and the outer circumference 41c of the movable end plate 41 have an outermost layer thereon, consisting of a black scale of the integral cast product "W" which is not cut during the first and second machining processes.

The movable scroll element 4 produced by the production method of the second embodiment of the present invention has the outermost layer consisting of the black scale generated by the mold casting process and remaining on the outer circumference 43a of the boss portion 43 and the outer circumference 41c of the movable end plate 41. Thus, the movable scroll element 4 produced by the production method of the second embodiment can be obtained by cutting only a part of the cast product "W", and the size and weight of the movable scroll element 4 can be reduced similarly to the scroll element 4 produced by the method of the first embodiment. Further, the production cost can be reduced resulting in lowering of the manufacturing cost of the scroll type compressor.

If desired, the outer end of the projecting portion 69 need not be machined so as to leave thereon the black scale which is generated during the sand mold casting process.

It should be understood that the described method of producing a movable scroll element for a scroll type compressor according to the present invention may be equivalently applied to the production of a movable scroll element having drive power receiving pins instead of the described boss portion 43.

Many and various modifications may occur to persons skilled in the art without departing from the spirit and scope of the present invention claimed in the accompanying claims.

What we claim:

1. A movable scroll element adapted for being accommodated in a scroll type compressor, and including a disk-like end plate having opposite end faces, a drive power receiving portion axially projecting from one of said opposite end faces of said end plate and receiving a drive power for causing an orbiting motion of said movable scroll element, and a spiral portion axially projecting from the other of said opposite end faces, wherein said movable scroll element is produced by applying a predetermined amount of machine cutting to an incomplete cast or forged product of said movable scroll element, and wherein said drive power receiving portion of said movable scroll element has an outer face on which an unmachined outermost layer remains on said incomplete cast or forged product without being subjected to machine cutting.

2. The movable scroll element according to claim 1, wherein said unmachined outermost layer of said incomplete cast or forged product comprises a black scale generated during a mold casting process of said incomplete product.

3. The movable scroll element according to claim 2, wherein said outer face of said drive power receiving portion includes an outer circumference and outer end of said drive power receiving portion.

4. The movable scroll element according to claim 2, wherein said drive power receiving portion of said movable scroll element comprises a boss portion having a cylindrical inner circumference on which a bearing is fitted.

5. The movable scroll element according to claim 1, wherein said disk-like end plate of said movable scroll element has an outer circumference on which an unmachined outermost layer of said incomplete cast or forged product remains without being subjected to machine cutting.

6. The movable scroll element according to claim 5, wherein said unmachined outermost layer of said incomplete cast or forged product comprises a black scale generated during a sand mold casting process of said incomplete product.

* * * * *